US006931452B1

United States Patent
Lamberton et al.

(10) Patent No.: US 6,931,452 B1
(45) Date of Patent: Aug. 16, 2005

(54) ROUTER MONITORING

(75) Inventors: Marc Lamberton, Antibes (FR); Eric Levy-Abegnoli, Nice (FR); Pierre Secondo, Tourettes-sur-Loup (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/537,242

(22) Filed: Mar. 28, 2000

(30) Foreign Application Priority Data

Mar. 30, 1999 (EP) .......................................... 99480015

(51) Int. Cl.⁷ .............................................. G06F 13/00
(52) U.S. Cl. ....................... 709/242; 709/224; 718/105
(58) Field of Search ................. 709/238, 224, 709/242, 105, 102; 370/395.31; 718/105, 102

(56) References Cited

U.S. PATENT DOCUMENTS

| | | | | |
|---|---|---|---|---|
| 5,473,599 A | * | 12/1995 | Li et al. ..................... 370/219 |
| 5,600,644 A | * | 2/1997 | Chang et al. ............... 370/404 |
| 5,668,952 A | | 9/1997 | Slane | |
| 5,774,660 A | | 6/1998 | Brendel et al. | |
| 5,854,901 A | * | 12/1998 | Cole et al. .................. 709/245 |
| 6,195,705 B1 | * | 2/2001 | Leung ......................... 709/245 |
| 6,487,605 B1 | * | 11/2002 | Leung ......................... 709/245 |
| 6,701,361 B1 | * | 3/2004 | Meier .......................... 709/224 |
| 6,754,220 B1 | * | 6/2004 | Lamberton et al. ......... 370/401 |

OTHER PUBLICATIONS

A. Bruce McDonald et al., "ARP Versus ES–IS: Performance Evaluation of Neighbour–Greeting Protocols," *Computer Journal*, vol. 39, No. 10, Jan. 1, 1996, pp. 854–867.

* cited by examiner

*Primary Examiner*—Kenneth R. Coulter
(74) *Attorney, Agent, or Firm*—Richard F. Frankeny; Winstead Sechrest & Minick P.C.

(57) ABSTRACT

A data transmission system for exchanging packetized data between any IP host selected from a cluster of IP hosts, each host having at least an IP layer, a network layer, and a plurality of workstations coupled by an intermediary of an IP network. The IP hosts are coupled to the IP network via a layer 2 network such as a LAN interfacing the IP network by a set of routers and a network dispatcher that receives all incoming data flow and dispatches the data to the cluster of hosts. The data transmission system comprises at least a monitoring device included in the cluster of hosts where the monitoring device is operable to monitor the availability of candidate routers selected from the set of possible routers. The monitoring device also is operable for broadcasting router availability information to each host in the cluster of hosts via the network dispatcher.

27 Claims, 2 Drawing Sheets

ROUTER MONITORING

TECHNICAL FIELD

The present invention relates in general to data processing systems, and in particular, to a new way for obtaining high availability and load balancing on default routers for IP host systems, and relates in particular to a router monitoring in such a system utilizing a network dispatcher for a cluster of hosts.

BACKGROUND INFORMATION

Several types of digital networks, operating with the packet switching technique in which data from different origins are chopped into fixed or variable length packets or datagrams, have been installed throughout the world. These digital networks may need to be interconnected (e.g. via routers) to optimize the possibilities of organizing traffic between source hosts and target hosts located anywhere in the world. Interconnecting such source hosts via routers is made possible by using an internetwork.

Internetwork (also referred to as Internet) facilities use a set of networking protocols such as Transmission Control Protocol/Internet Protocol (TCP/IP) developed to allow cooperating host computers to share resources across the Internetwork. TCP/IP is a set of data communication protocols that are referred to as the Internet protocol (IP) suite. Because TCP and IP are the best known, it has become common to use the term TCP/IP to refer to the whole protocol family. TCP and IP are two of the protocols in this suite. Other protocols of the suite are User Datagram Protocol (UDP), Address Resolution Protocol (ARP), Real Time Protocol (RTP), etc.

An Internetwork may thus be a collection of heterogeneous and independent networks using Transmission Control Protocol (TCP)/IP, and connected together by routers. The administrative responsibilities for the Internet (e.g., to assign IP addresses and domain names) can be within a single network, for example a Local Area Network (LAN), or distributed among multiple networks.

When a communication link for data transmission is to be established from a source host to a particular computer IP destination over an IP network, there are a number of methods to determine the first hop router of the network leading towards this destination. These include running (or snooping) a dynamic routing protocol such as Routing Information Protocol (RIP) or Open Shortest Path First (OSPF) version, running an Internet Control Message Protocol (ICMP) router discovery client or using a statically configured default route.

Running a dynamic routing protocol on every end-host may not be feasible for a number of reasons including: administrative overhead, processing overhead, security issues, or lack of a protocol implementation for some platforms. Neighbor or router discovery protocols may require active participation by all hosts on a network, thus leading to large timer values (time to set up a link) to reduce protocol overhead in face of a large number of hosts. This can result in significant delay in the detection of a lost (i.e., dead) neighbor, which may introduce unacceptably long "black hole" periods.

The use of a statically configured default route is quite popular, it minimizes configuration and processing overhead on the end-host and is supported by virtually every IP implementation. This mode of operation is likely to persist as Dynamic Host Configuration Protocol (DHCP) are deployed, which typically provide configuration for an end-host IP address and default gateway. However, this creates a single point of failure. Loss of the default router results in a catastrophic event, and isolates all end-hosts that are unable to detect any alternate path that may be available. One solution to solve this problem is to allow hosts to appear to use a single router and to maintain connectivity even if the actual first hop router they are using fails. Multiple routers participate in this protocol and in concert create the illusion of a single virtual router. The protocol insures that one and only one of the routers is forwarding packets on behalf of the virtual router. End hosts forward their packets to the virtual router. The router forwarding packets is known as the active router. A standby router is selected to replace the active router should it fail. The protocol provides a mechanism for determining active and standby routers using the IP addresses on the participating routers. If an active router fails, a standby router can take over without a major interruption in the host's connectivity.

Another similar approach is the use of Virtual Router Redundancy Protocol (VRRP) designed to eliminate the single point of failure inherent in the static default routed environment. VRRP specifies an election protocol that dynamically assigns responsibility for a virtual router to one of the VRRP routers on a LAN. The VRRP router controlling the IP address(es) associated with a virtual router is called the Master and forwards packets sent to these IP addresses. The election process provides dynamic fail-over in the forwarding responsibility should the Master become unavailable. Any of the virtual router's IP addresses on a LAN can then be used as the default first hop router by the end-hosts. The advantage gained by using VRRP is a higher availability default path without requiring configuration of dynamic routing or router discovery protocols on every end-host.

Unfortunately, the two above solutions cannot provide load balancing for a given host's traffic because only the router that answered the ARP is used. Also, customers are reluctant to change their main router configuration to enable such a function. Clearly, there is a need for a method of providing load balancing for traffic on the Internet.

An IP source may be provided with a new layer between the IP layer and the network layer for dynamically selecting a router from a set of candidate default routers, thereby insuring both load balancing and high availability. However, in the case of a configuration with a network dispatcher used as a front end to a cluster of hosts, a host will always receive incoming packets from the network dispatcher in response to ARP requests, as opposed to packets from candidate routers. In this case it may not be possible to maintain the status of active candidate routes by resetting the age of an entry in the ARP table each time a packet is received from a matching network (MAC) address. One solution is to issue periodic ARP requests to candidate routers with the drawback that all the hosts have to monitor all the individual routers.

Clearly there is, a need for a method and apparatus to issue ARP requests to candidate routers without having to monitor all individual routers.

SUMMARY OF THE INVENTION

The present invention provides a specific device for monitoring all the candidate routers in a data transmission system wherein a cluster of hosts is associated with a network dispatcher receiving all the incoming flows from an IP network. The present invention also discloses a method for determining the availability of candidate routers in a data transmission system wherein a cluster of hosts is associated with a network dispatcher receiving all the incoming flows from an IP network.

The disclosed data transmission system is used for exchanging packetized data between any IP host and a plurality of workstations connected by the intermediary of an IP network. Each IP host further comprises an IP layer and a network layer and connected to the IP network via a layer 2 network interfacing the IP network by a set of routers and a network dispatcher in charge of receiving all incoming flows from the workstations and dispatching amongst the cluster of hosts. The disclosed data transition system comprises at least one monitoring device included in the cluster of hosts comprising means for monitoring the availability of the routes and means for broadcasting the router availability information to each host of the cluster of hosts via the network dispatcher.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
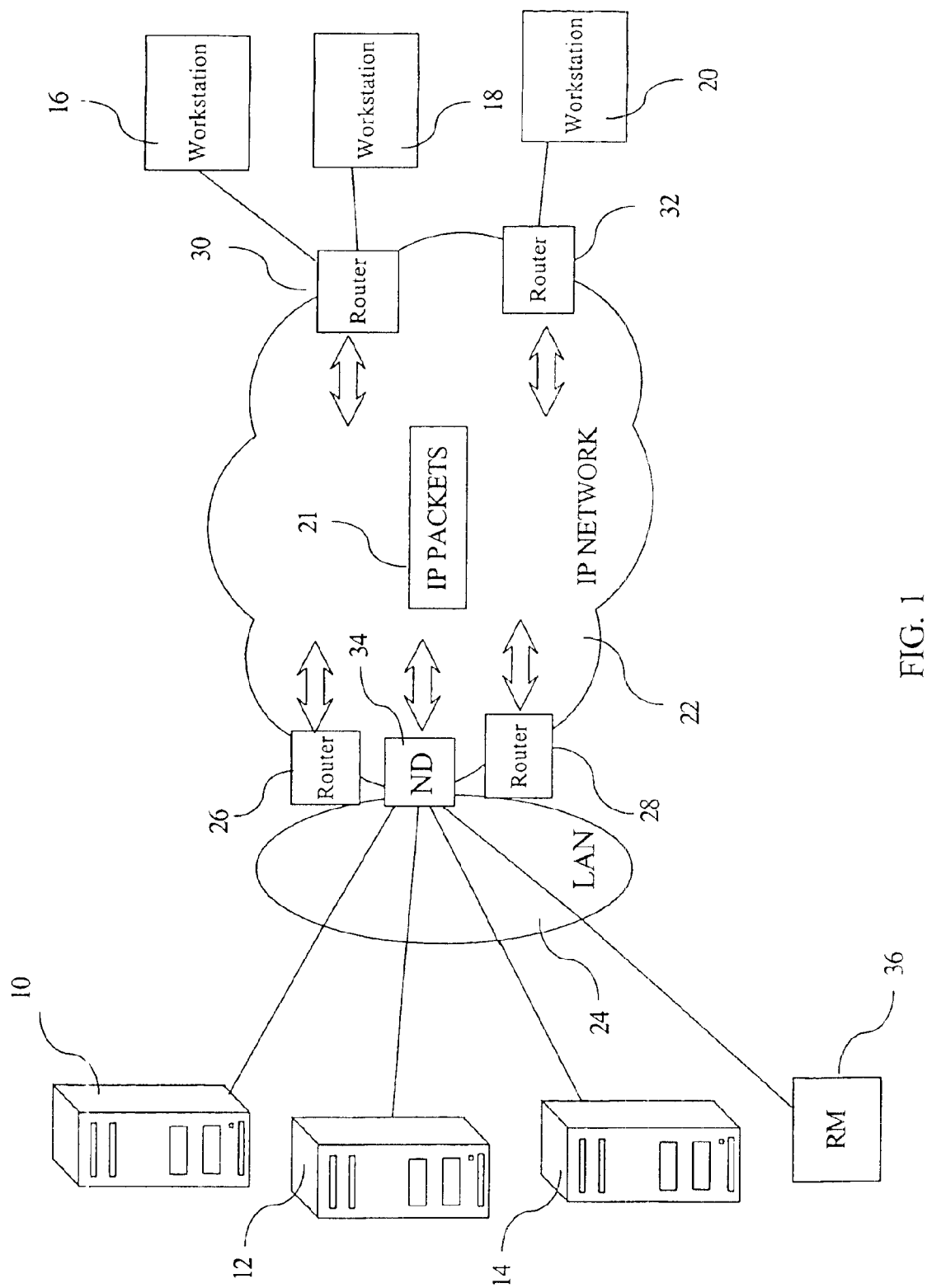
FIG. 1 represents schematically a data transmission system wherein a cluster of hosts incorporates a specific device for monitoring the availability of routers according to embodiments of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates embodiments of the present invention implemented in a data transmission system wherein a plurality of Internet Protocol (IP) hosts 10, 12, and 14, transmit data to one or several workstations 16, 18, 20 via IP network 22 by means of a layer 2 network such as a Local Area Network (LAN) 24. LAN 24 is interfacing IP network 22 by a set of input routers such as routers 26 and 28. The IP packets 21 are routed over the IP network 22 via a plurality of routers (not shown) until output routers, such as routers 30 and 32, are connected to exemplary workstations 16, 18, or 20.

Instead of using single default router to transmit data over the IP network 22, a technique described in U.S. patent application Ser. No. 09/523,056, filed Mar. 10, 2000, which is hereby incorporated by reference herein, is used. In this new technique, a host uses a new layer between the IP layer and the network layer, this additional network layer is operable to select one router from a set of candidate routers, such as the routers 26 or 28, by running an algorithm based upon parameters defined in the data packet which is transmitted.

In the present invention, it is assumed that the exemplary hosts 10, 12, 14 are grouped in a cluster associated with a network dispatcher 34 interfacing LAN 24 with IP network 22. Such a network dispatcher (ND) 34 is used to solve problems associated with keeping the processing load evenly spread or balanced on a group of hosts (or servers). In embodiments of the present invention illustrated in FIG. 1, a network dispatcher 34 operates as a dispatcher of connections from users (e.g., exemplary workstations 16, 18, and 20) which have a single IP address for a service available on a set of exemplary hosts 10, 12 and 14 which are operable to actually perform the work of the service. Only the IP packets going from the users, such as workstations 16, 18 and 28, pass through the exemplary network dispatcher ND 34. The IP packets from the IP host to workstations may go by other routes which need not include the exemplary network dispatcher ND 34, thereby reducing the load on ND 34 and allowing it to potentially stand in front of a large number of hosts.

Since a cluster of hosts (e.g., 10, 12, and 14) appear to a user (e.g., workstation 16, 18, 20) as the single address of a network dispatcher (e.g., ND 34), a user would have difficulty in determining the availability of a router (e.g., router 26 or, 28), interfacing the IP network 22, by only monitoring the IP packet received from the IP network as mentioned above. Embodiments of the present invention add a router monitoring (RM) device 36 as a new member of the cluster of hosts. Instead of requiring each IP host to send ARP requests to each candidate router 26 or 28) in order to determine the availability of the latter, RM 36 periodically sends (the period may be as short as one to ten seconds in order to insure the best service) a unicast Address Resolution Protocol (ARP) request to all the candidate routers, and then to inform all the IP hosts about the availability status of each router using a broadcast ARP response. Thus, this function is performed with minimum traffic and the number of IP host (or servers) using the set of candidate routers can scale up without increased control traffic.

It must be noted that the function of such RM 36 may be integrated in one of the IP hosts 10 12, 0r 14 and furthermore there may be several router monitoring devices or several IP hosts including this router monitoring function.

Figure 2:
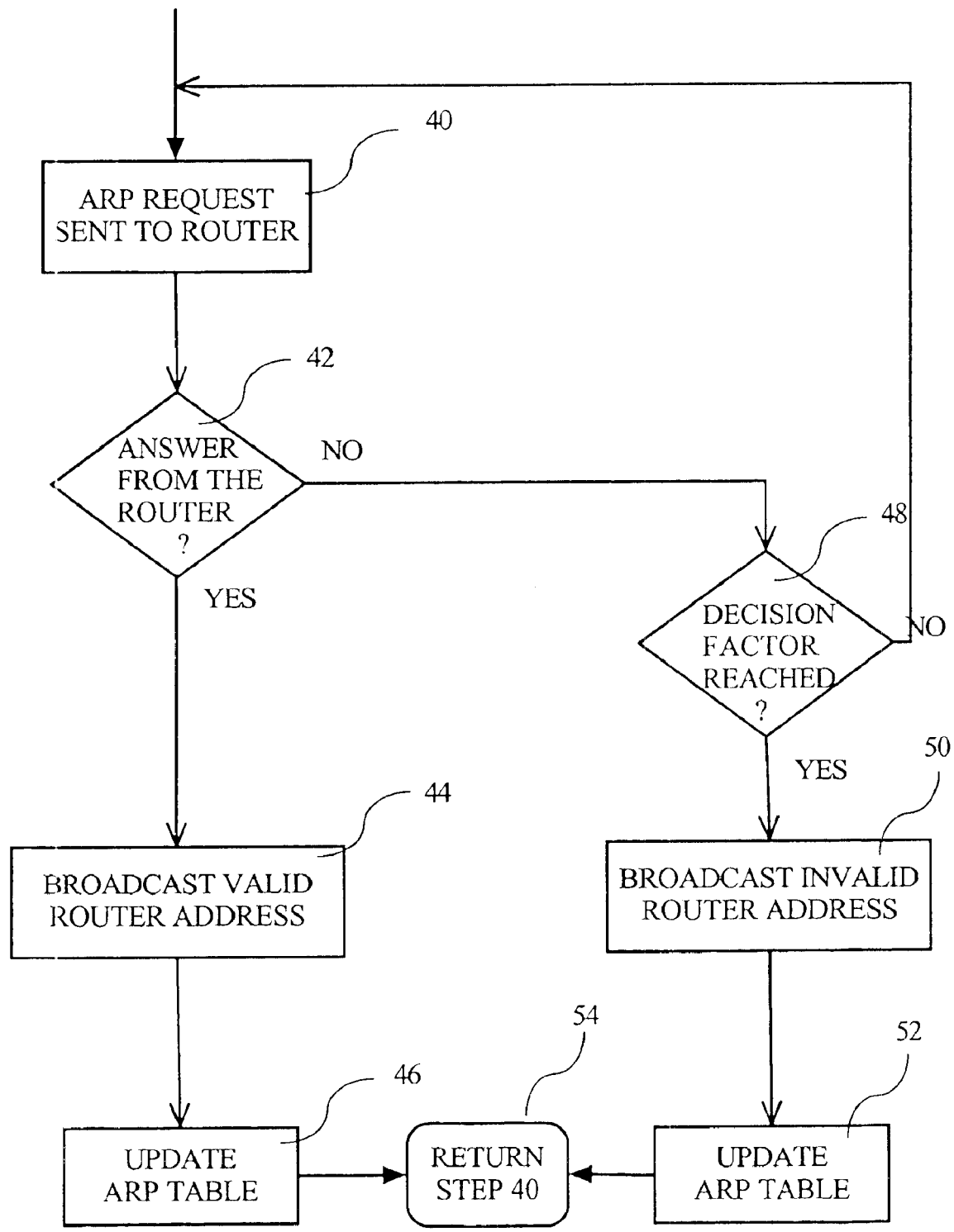
FIG. 2 is a flow chart of the method in embodiments of the present invention for monitoring the availability of the routers.

FIG. 2 illustrates method steps of embodiments of the present invention. An ARP request (for example a unicast request to all candidate routers) is sent to a router (step 40) on a periodical basis by a RM 36 (not shown in FIG. 2). Then, it is checked (step 42) to determine whether an answer is received from the router by RM 36. If so, this means that the router is available and an ARP response packet sent by the RM device to all IP hosts (step 44). This response is a matching network (MAC) address level broadcast indicating the IP address and the MAC address of the candidate router which has been requested as information indicating the availability of the router. This response forces all the IP hosts to update their corresponding entry to the ARP table (step 46).

When no answers are received from the candidate router being requested (step 42), a test is made (step 48) to determine whether a decision factor is reached. For example, a router which fails to answer three times in a row can be declared unavailable, however the decision factor may be of another type. Assuming the decision is reached, the RM 36 sends (step 50) an ARP response as a MAC address level broadcast to all the IP hosts. This response indicates the IP address of the router and its MAC address are set to a default value such as all zeros as information indicating the unavailability of the router. This forces all the IP hosts to update their own ARP table (step 52) by removing the ARP entry corresponding to the unavailable router after recognizing the invalid MAC address. Note that the entry can be updated with the invalid MAC address (e.g. all zeros) rather than removing the entry.

Although the present invention and its advantages have been described in detail, it should be understood that various changes, substitutions and alterations can be made herein without departing from the spirit and scope of the invention as defined by the appended claims.

What is claimed is:

1. A method of selecting a router by an IP host in a data transmission system transmitting packetized data from said IP host having at least an IP layer and a network layer to a plurality of workstations by the intermediary of an IP network and wherein said IP host is coupled to said IP network via a layer 2 network interfacing said IP network by a set of routers, comprising the method steps of:
    sending periodically a unicast ARP request to all candidate routers, said candidate routers selected from said set of routers; and
    transmitting to all IP hosts instructions to update their ARP table with router availability information.

2. The method according to claim 1, wherein router availability information is a MAC address of said candidate router when said candidate router is available and has answered.

3. The method according to claim 2, wherein said IP hosts update their ARP table when said IP hosts receive said MAC address of said candidate router.

4. The method according to claim 1, wherein said router availability information is a default value of a MAC address of a candidate router.

5. The method according to claim 2, wherein said IP hosts update their ARP table by removing a MAC address of a router when said router is determined to be unavailable.

6. The method according to claim 4, wherein said candidate router being requested is considered unavailable when it has not answered three monitoring requests in a sequence from a router monitoring device.

7. The method according to claim 5, wherein said candidate router being requested is considered unavailable when it has not answered three monitoring requests in a sequence from a router monitoring device.

8. A computer program product embodied in a machine readable medium, including a programming method for selecting a router by an IP host in a data transmission system transmitting packetized data from said IP host having at least an IP layer and a network layer to a plurality of workstations by the intermediary of an IP network and wherein said IP host is coupled to said IP network via a layer 2 network interfacing said IP network by a set of routers comprising, a program of instructions for performing the method steps of:
    sending periodically a unicast ARP request to all candidate routers, said candidate routers selected from said set of routers; and
    transmitting to all IP hosts instructions to update their ARP table with router availability information.

9. The computer program product according to claim 8, wherein router availability information is a MAC address of said candidate router when said candidate router is available and has answered.

10. The computer program product according to claim 9, wherein said IP hosts update their ARP table when said IP hosts receive said MAC address of said candidate router.

11. The computer program product according to claim 8, wherein said router availability information is a default value of a MAC address of a candidate router.

12. The computer program product according to claim 9, wherein said IP hosts update their ARP table by removing a MAC address of a router when said router is determined to be unavailable.

13. The computer program product according to claim 11, wherein said candidate router being requested is considered unavailable when it has not answered three monitoring requests in a sequence from a router monitoring device.

14. The computer program product according to claim 12, wherein said candidate router being requested is considered unavailable when it has not answered three monitoring requests in a sequence from a router monitoring device.

15. A data transmission system for transmitting packet data from an Internet Protocol (IP) host comprising:
    an IP layer;
    a network layer adaptable for coupling to a plurality of workstations by an intermediary of an IP network, wherein said IP host is coupled to said IP network via a layer 2 network, said layer 2 network interfacing said IP network with a set of routers;
    a network dispatcher, said network dispatcher coupled to said IP network and operable for receiving all incoming data flows from said workstations and dispatching them to said cluster of hosts;
    a monitoring device, said monitoring device monitoring the information defining availability of said routers; and
    a broadcasting device, said broadcasting device operable for broadcasting said router availability information to each host of said cluster of hosts via said network dispatcher.

16. The data transmission system according to claim 15, wherein at least one monitoring device is incorporated in one of said IP hosts in said cluster of IP hosts.

17. The data transmission system according to claim 15, wherein said monitoring device sends, periodically, a unicast ARP request to candidate routers, said candidate routers selected from said set of routers.

18. The data transmission system according to claim 16, wherein said monitoring device sends, periodically, a unicast ARP request to candidate routers, said candidate routers selected from said set of routers.

19. The data transmission system according to claim 17, wherein said unicast ARP request sent to all candidate routers is sent on a periodic basis between 1 and 10 seconds.

20. The data transmission system according to claim 18, wherein said unicast ARP request sent to all candidate routers is sent on a periodic basis between 1 and 10 seconds.

21. The data transmission system according to claim 15, wherein said broadcast device sends a MAC level broadcast indicating a MAC address of said requested router and said router availability information.

22. The data transmission system according to claim 21, wherein said router availability information is said MAC address of an available router that has answered.

23. The data transmission system according to claim 22, wherein said IP hosts update their ARP table when said IP hosts receive said MAC address of a requested router.

24. The data transmission system according to claim 21, wherein said router availability information is a default value of said MAC address of an unavailable router.

25. The data transmission system according to claim 24, wherein said IP hosts update their ARP table by removing said MAC address of a router when said router is determined to be unavailable.

26. The data transmission system according to claim 25, wherein said router being requested is considered unavailable when it has not answered three monitoring requests in a sequence from said monitoring device.

27. The data transmission system according to claim 26, wherein said router being requested is considered unavailable when it has not answered three monitoring requests in a sequence from said monitoring device.

* * * * *